July 1, 1930.  C. B. FAVERTY  1,769,682
ROAD GRADER
Filed July 28, 1928   2 Sheets-Sheet 1
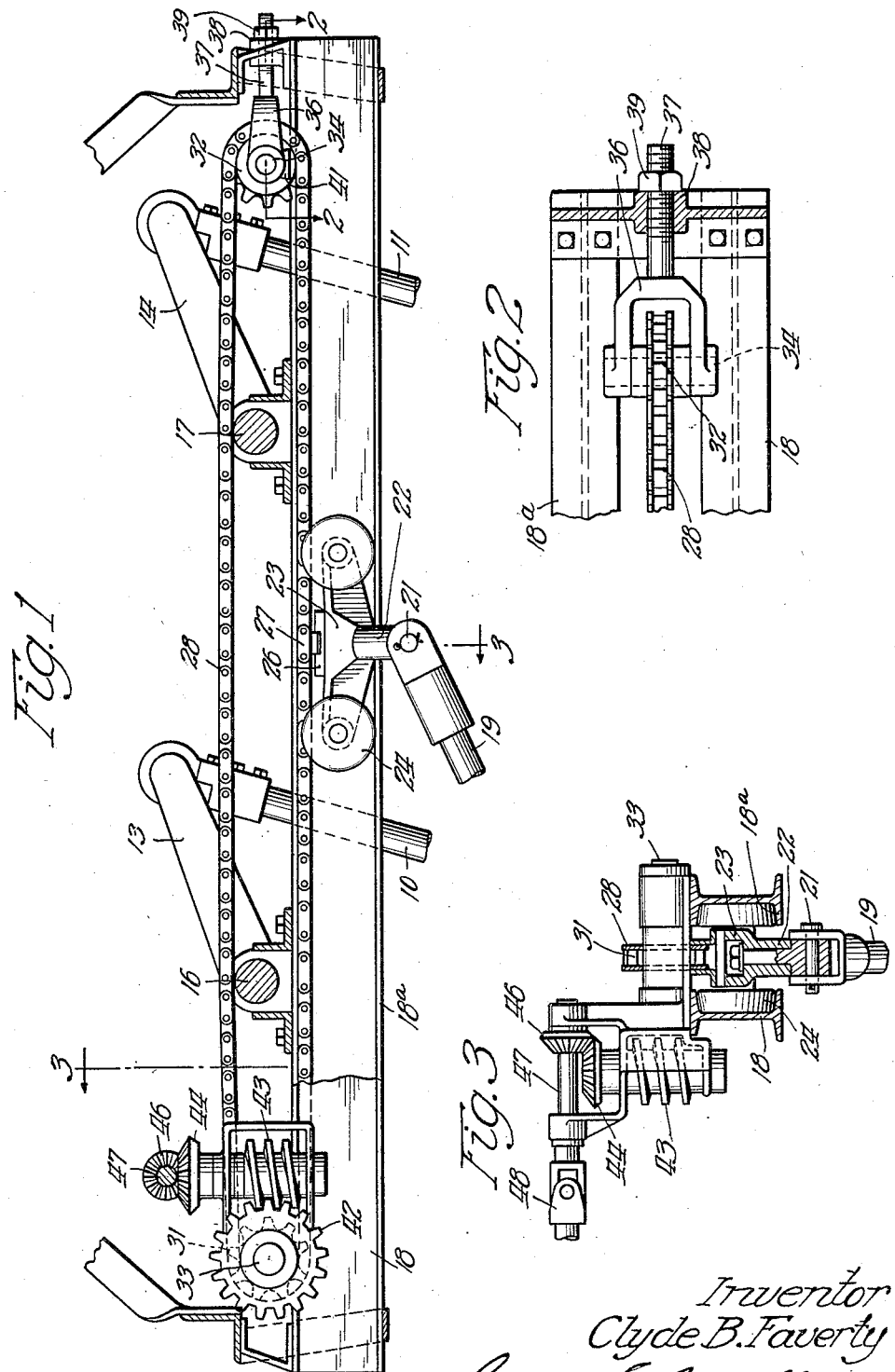
Inventor
Clyde B. Faverty
George E. Mueller Atty.

July 1, 1930. C. B. FAVERTY 1,769,682
ROAD GRADER
Filed July 28, 1928 2 Sheets-Sheet 2
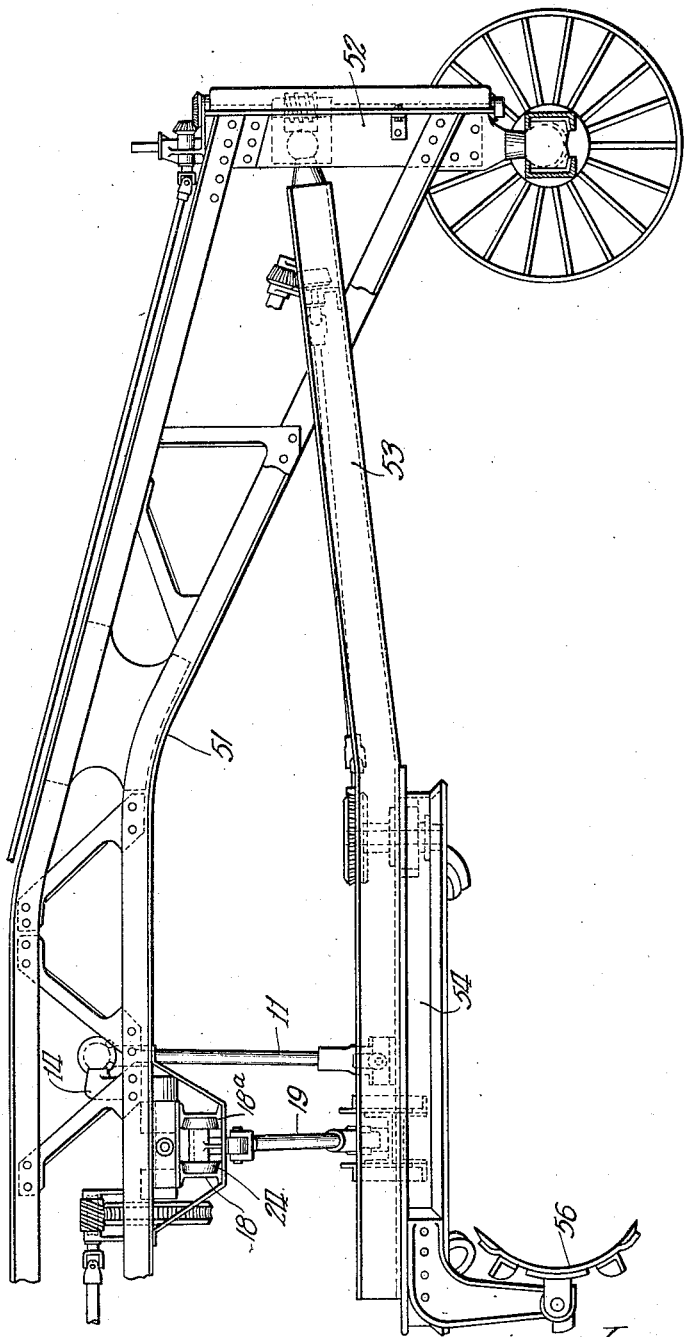

Patented July 1, 1930

1,769,682

UNITED STATES PATENT OFFICE

CLYDE B. FAVERTY, OF HAMMOND, INDIANA, ASSIGNOR TO RYAN MNFG. CORPORATION, OF CHICAGO, ILLINOIS, A CORPORATION OF ILLINOIS

ROAD GRADER

Application filed July 28, 1928. Serial No. 295,863.

My invention relates in general to road graders and more particularly to a novel operating and adjusting mechanism for a specific element thereof by means of which the manufacture, operation and care of the grader are greatly improved and simplified.

The type of grader to which the invention is particularly adaptable is shown in the copending application of Daniel C. Hinds, Serial No. 689,416, filed January 30, 1924. In this type of grader there is a wheeled carriage having a main frame from which is supported in depending relation a drawbar carrying a mold board in suitable adjustable position thereon. The rear end of the drawbar is supported by a number of links, two of which are connected to crank arms for elevating or lowering the drawbar, while the other link is connected to a side shifting carriage operable in a transverse track whereby the entire drawbar can be shifted sideways of the main frame. The side shifting of the carriage is accomplished by a sprocket chain having one of its links secured to the side shifting carriage, the chain itself being trained around a pair of sprocket gears through one of which the drive for the chain is provided.

The principal object of my invention is to provide an improved side shift carriage and driving means therefor.

Another object of the invention is to provide an improved method for mounting the side shifting chain.

Another object is to provide means for adjusting the tension of the side shifting chain.

Another object is to provide an improved idler gear assembly.

In accomplishing the invention, a pair of I-beams extend transversely of the grader frame and form a track on which a miniature wheeled carriage is reciprocable by a side shifting chain trained around a pair of sprocket gears, one of these gears being provided with a novel driving means, and the other acting as an idler and having adjustment features in connection therewith. The idler sprocket wheel or gear is held in position by a yoke which has a threaded bolt for a shank, this shank extending through a plate secured on the end of the track or carriage runway and being provided with a nut which is turned in either direction either to tighten or loosen the chain. A pair of stabilizing projections extend downwardly from the yoke and engage the top of the track so that rotary motion of the yoke and shank around the axis thereof is prevented.

Other objects and features of the invention will be apparent from a consideration of the detailed description taken with the accompanying drawings, wherein Fig. 1 is a side elevational view showing a portion of the grader drawbar adjustment and also a preferred embodiment of the mounting and adjusting mechanism constituting the present invention, and Figs. 2 and 3 are sectional views taken along the lines 2—2 and 3—3 of Fig. 1 respectively looking in the direction of the arrows; and Fig. 4 shows the invention as actually applied to a grader.

Referring now to the drawings, the drawbar is adapted to be supported at its rear end by links 10 and 11 which depend from cranks 13 and 14 mounted on rotatable shafts 16 and 17. These shafts are suitably journaled in brackets held by a pair of I-beams 18, serving as a support for this portion of the apparatus, and also acting as a track for accommodating the side-thrust carriage.

A third link 19 is suitably secured at its lower end at one side of the drawbar and serves to shift the same from side to side while also supporting some of the weight thereof when certain adjustments are used. The upper part of the link 19 is pivoted at 21 to a shank 22 depending downwardly from a side shifting carriage 23. This carriage is provided with four wheels 24—24 which are adapted to ride along track surfaces formed by the lower flange 18ᵃ of the I-beams. The upper part of the carriage has a plate 26 which is connected to a special link 27 forming a part of a side-thrust chain 28. This chain is trained around a pair of transversely aligned sprocket wheels 31 and 32, the sprocket wheel 31 being fixed on an immovable but rotatable shaft 33 through which the drive for the side-shift chain is provided.

The invention concerns itself greatly with the mounting for the idler sprocket wheel 32. This wheel is provided with a shaft 34 having its ends journaled in the side projections of a yoke 36, said yoke provided with a threaded shank 37 extending through an end plate 38 carried on the ends of the I-beams. A nut 39 is threaded on the projecting end of the shank and its position thereon may be changed to regulate the transverse position of the yoke and idler sprocket wheel, whereby the tension of the side-thrust chain will be controlled. At each side of the yoke 36 is provided a stabilizing projection 41 designed to engage along the top of the I-beams for the purpose of preventing motion of the shank about its axis.

In order to power drive the side shift chain as contemplated in the present type of grader, the shaft 33 has keyed or otherwise secured thereto, a worm gear 42 which meshes with and is driven by a worm 43. This worm is driven by a bevel gear 44 which is keyed to the worm shaft and meshes with a companion bevel gear 46 keyed to a short shaft 47, which, through suitable connections including for example a universal joint 48, leads to a source of power (not shown).

Fig. 4 shows a side elevation of the main portions of a grader with which may present invention is adapted to be used.

The main frame 51 has a front post 52 in which a drawbar 53 is connected by means of a universal joint and in such a way that it may be reciprocated vertically within the front post. The drawbar supports a circular frame 54, adjustable with respect thereto, and the circular frame carries a moldboard 56. The links 10 and 11 pivoted to the cranks 13 and 14 are also pivoted at their lower ends to the drawbar and so by means of these links and the side shifting link 19 and the adjustment at the front end of the drawbar the moldboard is capable of being put into a number of positions for grading purposes.

The present embodiment of the invention is simple and economical to manufacture and has the advantage when put into operation of being very easily handled. This is of importance as the proper control of the drawbar to obtain the various adjustments possible with this type of grader requires a simple rugged construction as well as an accurate control of the tension of the side-shift chain.

Although the invention has been described in detail, it is limited only by the scope of the following claims.

What I claim as new and desire to secure by United States Letters Patent is:

1. In a road grader, a main frame, a mold board carrying drawbar suspended beneath said main frame, a pair of channeled members carried by the frame forming a closed transverse track, a wheeled carriage reciprocable along said track and a connection from the carriage to the drawbar to transmit the sidewise movement of the carriage to the drawbar and cooperate with the drawbar suspending means to provide a range of working adjustments.

2. In a road grader, a main frame, a drawbar suspended below the main frame, a side shifting trolley for the drawbar secured on the main frame, said side shifting trolley including a track, a carriage on the track, a driving sprocket gear, an idler sprocket gear, a sprocket chain trained around said gears and a mounting for the idler gear including a yoke, a threaded shank on the yoke, a nut threaded on said shank and designed to be turned to regulate the tension of the chain, the mounting for said idler gear comprising a yoke for receiving the idler gear shaft, a pair of stabilizing projections adapted to ride along the track to prevent turning of the yoke and means for forcing the yoke with the idler gear in either direction with respect to the driving gear.

3. In a road grader, a main frame, a drawbar suspended below the main frame, a side shifting trolley for the drawbar secured on the main frame, said side shifting trolley including a track, a carriage on the track, a driving sprocket gear, an idler sprocket gear, a sprocket chain trained around said gears and a mounting for the idler gear including a yoke, a threaded shank on the yoke, a nut threaded on said shank and designed to be turned to regulate the tension of the chain, the mounting for said idler gear comprising an end plate on the track, a yoke for receiving the idler gear shaft and having a threaded shank extending through the end plate, a nut on the shank and a pair of stabilizing projections carried by the yoke for preventing the turning of the yoke and gear when the nut is actuated to regulate the tension of the chain.

4. In a road grader, a main frame, a mold board suspended beneath the main frame, a closed track disposed transversely of the frame, a carriage reciprocable on the track and having an operable association with the mold board to move the same, a pair of sprocket gears at opposite ends of the track, a chain trained around said gears and connecting with said carriage, and means for driving said chain, said means including a shaft on which one of said sprocket gears is secured, a worm gear on said shaft, a worm meshing with said worm gear, and a gear and shaft connection from the worm gear to a suitable source of power.

5. The combination defined in claim 4 wherein the sprocket gear furnishing the drive is stationary, the opposed sprocket gear having adjusting means for regulating the tension of the side shift chain.

In witness whereof, I hereunto subscribe my name this 10th day of May, 1928.

CLYDE B. FAVERTY